US008700954B2

(12) United States Patent
Watanabe et al.

(10) Patent No.: US 8,700,954 B2
(45) Date of Patent: Apr. 15, 2014

(54) COMMON TROUBLE CASE DATA GENERATING METHOD AND NON-TRANSITORY COMPUTER-READABLE MEDIUM STORING COMMON TROUBLE CASE DATA GENERATING PROGRAM

(75) Inventors: Yukihiro Watanabe, Kawasaki (JP); Yasuhide Matsumoto, Kawasaki (JP); Atsuji Sekiguchi, Kawasaki (JP); Yuji Wada, Kawasaki (JP); Masazumi Matsubara, Kawasaki (JP); Shinji Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 13/011,148

(22) Filed: Jan. 21, 2011

(65) Prior Publication Data

US 2011/0185236 A1    Jul. 28, 2011

(30) Foreign Application Priority Data

Jan. 28, 2010    (JP) .................................. 2010-017454

(51) Int. Cl.
   *G06F 11/00*    (2006.01)
(52) U.S. Cl.
   USPC ............................................ 714/26; 702/185
(58) Field of Classification Search
   USPC .................. 714/1, 2, 26, 48; 702/185
   See application file for complete search history.

(56) References Cited

U.S. PATENT DOCUMENTS

| | | | | |
|---|---|---|---|---|
| 6,012,152 A | * | 1/2000 | Douik et al. ..................... | 714/26 |
| 6,622,264 B1 | * | 9/2003 | Bliley et al. ..................... | 714/26 |
| 7,137,041 B2 | * | 11/2006 | Kaminsky et al. ............ | 714/47.1 |
| 7,266,758 B2 | * | 9/2007 | Takeuchi et al. .............. | 714/799 |
| 7,941,706 B2 | * | 5/2011 | Yuasa et al. ................... | 714/47.1 |
| 8,151,141 B1 | * | 4/2012 | Bennett et al. .................. | 714/26 |
| 2003/0040878 A1 | * | 2/2003 | Rasmussen et al. ............ | 702/85 |
| 2004/0156311 A1 | | 8/2004 | Hirano et al. | |

FOREIGN PATENT DOCUMENTS

| | | |
|---|---|---|
| JP | 03-211626 A | 9/1991 |
| JP | 2001-251095 | 9/2001 |
| JP | 2005-167347 A | 6/2005 |
| JP | 2005-267351 | 9/2005 |
| WO | WO 02/067069 A | 8/2002 |

OTHER PUBLICATIONS

Japanese Office Action Nov. 12, 2013 for corresponding Japanese Application No. 2010-017454, with partial English-language translation.

* cited by examiner

*Primary Examiner* — Yolanda L Wilson
(74) *Attorney, Agent, or Firm* — Fujitsu Patent Center

(57) ABSTRACT

A method of generating common trouble case data for managing a plurality of systems. The method includes (a) obtaining first identifiers of actual system components and a second identifier of a template from a system data storage unit, (b) obtaining third identifiers of definitional system components from a template data storage unit on the basis of the second identifier, (c) selecting, by a computer, a first identifier subset among the first identifiers on the basis of the third identifiers, and (d) selecting, by the computer, a first trouble case data subset among a plurality of first trouble case data pieces on the basis of the first identifier subset to generate the common trouble case data. In the above (c), the first identifiers of the first identifier subset are identical to the third identifiers. In the above (d), the first trouble case data subset includes the first identifier subset.

21 Claims, 23 Drawing Sheets

FIG. 7

| DEVICE TYPE ID | TMPL_WEB_01 |
|---|---|
| DEVICE TYPE | Web Server |
| OS | ubuntu server 8.04 |
| CPU | Xeon 2.8GHz |
| MEMORY | 2048MB |
| HARD DISK | 40GB |
| SOFTWARE | Apache |
|  | PHP |
| FILE | /var/www/httdocs/index.html |
|  | /var/www/php/webapps/shop.war |
| ⋮ | ⋮ |

FIG. 8

| DEVICE TYPE ID | TMPL_DB_01 |
|---|---|
| DEVICE TYPE | DB Server |
| OS | ubuntu server 8.04 |
| CPU | Xeon 2.8GHz |
| MEMORY | 2048MB |
| HARD DISK | 40GB |
| SOFTWARE | MySQL |
| FILE | /etc/mysql/my.conf |
| ⋮ | ⋮ |

FIG. 9

| LIST ID | TMPL_LIST_01 |
|---|---|
| SYSTEM COMPONENT ID | DEVICE TYPE ID |
| SVR01 | TMPL_WEB_01 |
| SVR02 | TMPL_WEB_01 |
| SVR03 | TMPL_DB_01 |
| SW01 | TMPL_SW_01 |
| SW02 | TMPL_SW_01 |
| SLB01 | TMPL_SLB_01 |

FIG. 10

| CONNECTION RELATIONSHIP ID | TMPL_LIST_01 | | |
|---|---|---|---|
| CONNECTION ID | START POINT | END POINT | REGION |
| LINK01 | SLB01 | SW01 | DMZ |
| LINK02 | SW01 | SVR01 | DMZ |
| LINK03 | SW01 | SVR02 | DMZ |
| LINK04 | SVR01 | SW02 | INTERNAL |
| LINK05 | SVR02 | SW02 | INTERNAL |
| LINK06 | SW02 | SVR03 | INTERNAL |

FIG. 11

| INSTANCE ID | INS_WEB_01 |
|---|---|
| DEVICE TYPE ID | TMPL_WEB_01 |

FIG. 12

| INSTANCE ID | INS_WEB_02 |
|---|---|
| DEVICE TYPE ID | TMPL_WEB_01 |
| FILE | /var/www/httdocs/css/custom.css |
| | ⋮ |

FIG. 13

| INSTANCE ID | INS_SW_01 |
|---|---|
| DEVICE TYPE ID | TMPL_SW_01 |

FIG. 14A

| INSTANCE ID | INS_SLB_01 |
|---|---|
| DEVICE TYPE ID | TMPL_SLB_01 |

FIG. 14B

| INSTANCE ID | INS_DB_01 |
|---|---|
| DEVICE TYPE ID | TMPL_DB_01 |

FIG. 15

| LIST ID | TMPL_LIST_01 | |
|---|---|---|
| SYSTEM COMPONENT ID | SYSYTEM COMPONENT NAME | INSTANCE ID |
| SVR01 | web_a | INS_WEB_01 |
| SVR02 | web_b | INS_WEB_01 |
| SVR03 | db_a | INS_DB_01 |
| SW01 | sw_a | INS_SW_01 |
| SW02 | sw_b | INS_SW_01 |
| SLB01 | slb_a | INS_SLB_01 |
| SVR04 | web_c | INS_WEB_02 |

FIG. 16

| CONNECTION RELATIONSHIP ID | TMPL_LINK_01 | | |
|---|---|---|---|
| CONNECTION ID | START POINT | END POINT | REGION |
| LINK01 | SLB01 | SW01 | DMZ |
| LINK02 | SW01 | SVR01 | DMZ |
| LINK03 | SW01 | SVR02 | DMZ |
| LINK04 | SVR01 | SW02 | INTERNAL |
| LINK05 | SVR02 | SW02 | INTERNAL |
| LINK06 | SW02 | SVR03 | INTERNAL |
| LINK07 | SW01 | SVR04 | DMZ |
| LINK08 | SVR04 | SW02 | INTERNAL |

FIG. 17

| REGION | IP ADDRESS |
|---|---|
| DMZ | 192.168.0.0/24 |
| INTERNAL | 192.168.1.0/24 |

FIG. 18

| NUMBER | DATE AND TIME OF TROUBLE | DETAILS OF TROUBLE | NAME OF SYSYTEM COMPONENT CAUSING TROUBLE | CAUSE OF TROUBLE |
|---|---|---|---|---|
| 65 | 9/2/2009 | NO RESPONSE FROM WEB | web_a | NETWORK CARD FAILURE |
| 66 | 9/16/2009 | CANNOT BE CONNECTED | sib_a,web_c | DISTRIBUTED SETTING FAILURE |
| 67 | 9/22/2009 | WEB SLOWDOWN | db_a | MEMORY ALMOST FULLY USED |
| ... | ... | ... | ... | ... |

FIG. 20A

| NUMBER | DATE AND TIME OF TROUBLE | DETAILS OF TROUBLE | NAME OF SYSTEM COMPONENT CAUSING TROUBLE | ID OF SYSTEM COMPONENT CAUSING TROUBLE | CAUSE OF TROUBLE |
|---|---|---|---|---|---|
| 65 | 9/2/2009 | NO RESPONSE FROM WEB | web_a | SVR01 | NETWORK CARD FAILURE |
| 66 | 9/16/2009 | CANNOT BE CONNECTED | slb_a.web_c | SLB01,SVR04 | DISTRIBUTED SETTING FAILURE |
| 67 | 9/22/2009 | WEB SLOWDOWN | db_a | SVR03 | MEMORY ALMOST FULLY USED |
| ... | ... | ... | ... | ... | ... |

FIG. 20B

| NUMBER | DATE AND TIME OF TROUBLE | DETAILS OF TROUBLE | NAME OF SYSTEM COMPONENT CAUSING TROUBLE | DEVICE TYPE ID OF DEVICE CAUSING TROUBLE | CAUSE OF TROUBLE |
|---|---|---|---|---|---|
| 65 | 9/2/2009 | NO RESPONSE FROM WEB | web_a | TMPL_WEB_01 | NETWORK CARD FAILURE |
| 66 | 9/16/2009 | CANNOT BE CONNECTED | slb_a.web_c | TMPL_SLB_01, TMPL_WEB_01 | DISTRIBUTED SETTING FAILURE |
| 67 | 9/22/2009 | WEB SLOWDOWN | db_a | TMPL_DB_01 | MEMORY ALMOST FULLY USED |
| ... | ... | ... | ... | ... | ... |

COMMON TROUBLE CASE DATA GENERATING METHOD AND NON-TRANSITORY COMPUTER-READABLE MEDIUM STORING COMMON TROUBLE CASE DATA GENERATING PROGRAM

CROSS-REFERENCE TO RELATED APPLICATION

This application is based upon and claims the benefit of priority of the prior Japanese Patent Application No. 2010-017454, filed on Jan. 28, 2010, the entire contents of which are incorporated herein by reference.

FIELD

The embodiments discussed herein relate to a technique for managing systems.

BACKGROUND

In recent years, a computer usage model, in which users do not own a system and the users use only necessary system resources that are present on networks such as the Internet, is starting to become widely used. This computer usage model is called cloud computing. In general, cloud computing service providers manage multiple systems and provide services to multiple users (also called tenants).

When trouble occurs in a system, an administrator of the system records and accumulates the details, cause and the like of the failure so that the accumulated data (trouble case data) can be used when the failure reoccurs in some cases. The accumulated trouble case data is used for management of other systems as well as for the system in which the failure occurred. In a conventional technique, when an abnormality occurs in a plant, another plant that includes the same type of equipment as equipment that indicated a sign of the abnormality is detected, and information is provided to an administrator of the detected plant in order to prevent the abnormality from occurring in the detected plant.

However, even when a system built to provide cloud computing services and the like is specified according to the standard used in the conventional technique, effective information cannot be provided. Thus, system management is not efficient.

International Publication Pamphlet No. 2002/067069 is an example of related art.

SUMMARY

According to an aspect of the embodiments, a method of generating common trouble case data for managing a plurality of systems, the method includes obtaining first identifiers of actual system components and a second identifier of a template from a system data storage unit, obtaining third identifiers of definitional system components from a template data storage unit on the basis of the second identifier, the third identifiers being associated with the second identifier, selecting, by a computer, a first identifier subset among the first identifiers on the basis of the third identifiers, the first identifiers of the first identifier subset being identical to the third identifiers, and selecting, by the computer, a first trouble case data subset among a plurality of first trouble case data pieces stored in a first trouble case data storage unit on the basis of the first identifier subset to generate the common trouble case data, the first trouble case data subset including the first identifier subset According to another aspect of the embodiments, a method of generating common trouble case data for managing a plurality of systems, includes obtaining first type identifiers of devices from a system data storage unit, the devices being associated with system components that constitute respective systems, counting the number of each of the first type identifiers, selecting, by a computer, a first identifier subset among the first type identifiers on the basis of the counted numbers, the counted number of the first identifier of the first identifier subset satisfying a predetermined condition, and selecting, by the computer, a first trouble case data subset among a plurality of first trouble case data pieces stored in a first trouble case data storage unit on the basis of the first identifier subset to generate the common trouble case data, the first trouble case data subset including the first identifier subset.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of data that is stored in a device type table.

FIG. 8 is a diagram illustrating an example of data that is stored in another device type table.

FIG. 9 is a diagram illustrating an example of data that is stored in a component table.

FIG. 10 is a diagram illustrating an example of data that is stored in a connection table.

FIG. 11 is a diagram illustrating an example of data that is stored in a device type setting table.

FIG. 12 is a diagram illustrating an example of data that is stored in the device type setting table.

FIG. 13 is a diagram illustrating an example of data that is stored in another device type setting table.

FIG. 14A is a diagram illustrating an example of data that is stored in another device type setting table.

FIG. 14B is a diagram illustrating an example of data that is stored in another device type setting table.

FIG. 15 is a diagram illustrating an example of data that is stored in a component setting table.

FIG. 16 is a diagram illustrating an example of data that is stored in a connection setting table.

FIG. 17 is a diagram illustrating an example of data that is stored in a network setting table.

FIG. 18 is a diagram illustrating an example of data that is stored in a trouble case DB.

FIG. 20A is a diagram illustrating an example of data that is stored in an abstracted trouble case data storage unit.

FIG. 20B is a diagram illustrating an example of data that is stored in an abstracted trouble case data storage unit.

DESCRIPTION OF EMBODIMENTS

First Embodiment

Figure 1:
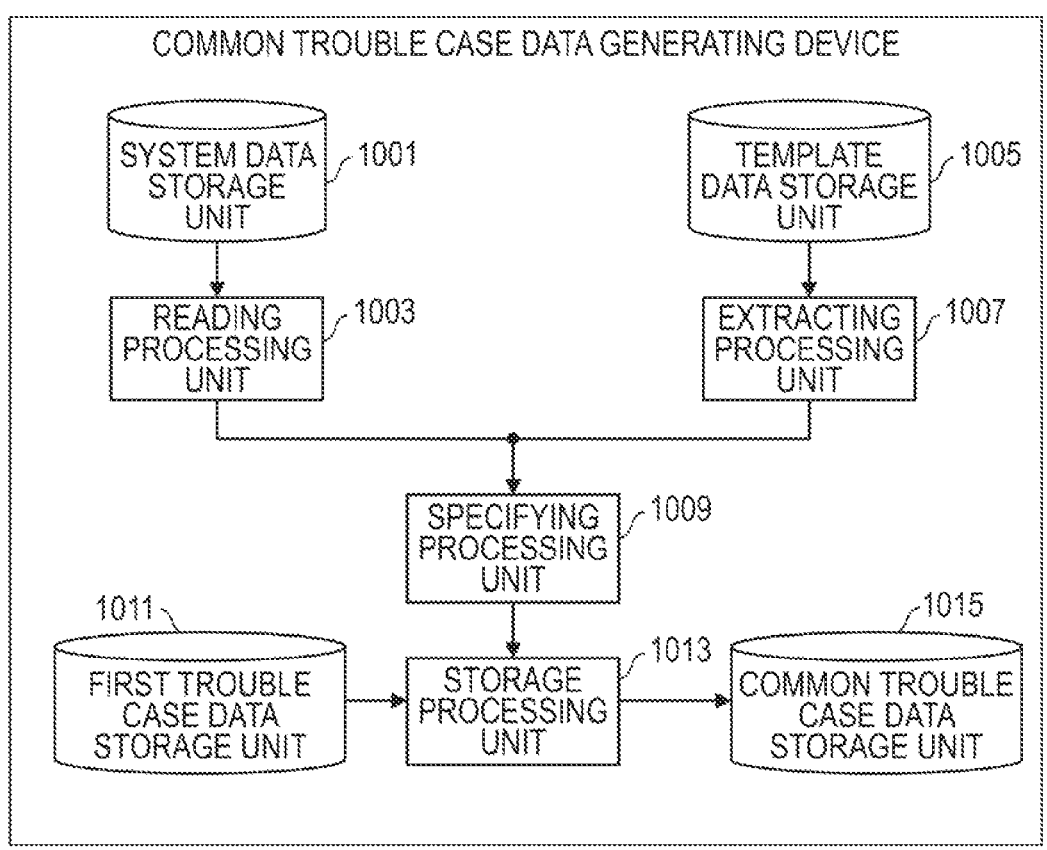
FIG. 1 is a functional block diagram illustrating a common trouble case data generating device according to a first embodiment.

FIG. 1 is a functional block diagram illustrating a common trouble case data generating device according to a first embodiment. The common trouble case data generating device according to the first embodiment includes a system data storage unit 1001, a reading processing unit 1003, a template data storage unit 1005, an extracting processing unit 1007, a specifying processing unit 1009, a first trouble case data storage unit 1011, a storage processing unit 1013 and a common trouble case data storage unit 1015. The reading processing unit 1003 performs a process using data stored in the system data storage unit 1001. The extracting processing unit 1007 performs a process using data stored in the template data storage unit 1005. The specifying processing unit 1009 performs a process using the results of the process performed by the reading processing unit 1003 and the results of the process performed by the extracting processing unit 1007. The storage processing unit 1013 performs a process using the result of the process performed by the specifying processing unit 1009 and data stored in the first trouble case data storage unit 1011. The storage processing unit 1013 causes the result of the process performed by the storage processing unit 1013 to be stored in the common trouble case data storage unit 1015.

Figure 2:
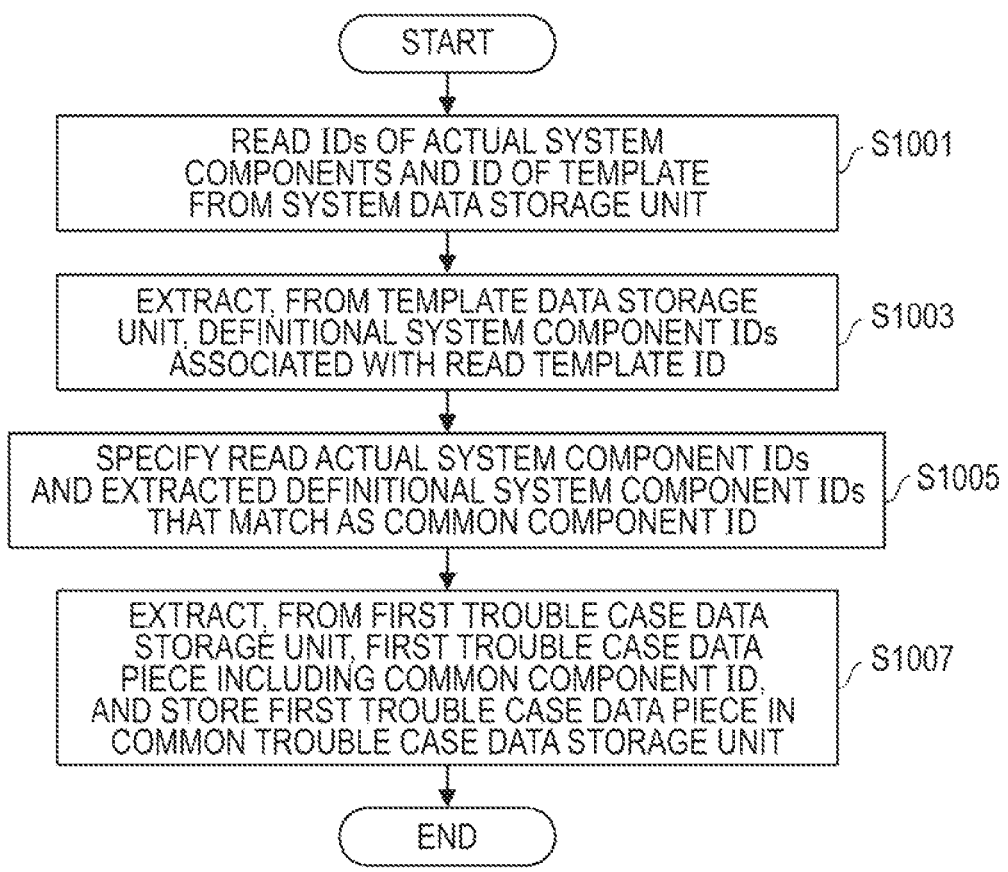
FIG. 2 is a flowchart of a process according to the first embodiment.

Next, the details of a process that is performed by the common trouble case generating device illustrated in FIG. 1 are described with reference to FIG. 2. The system data storage unit 1001 has stored therein the IDs of actual system components that are used in a system and the ID of a template used to build the system. First, the reading processing unit 1003 reads, from the system data storage unit 1001, the IDs of the actual system components that are used in the system and the ID of the template used to build the system (in step S1001). The template data storage unit 1005 has stored therein the IDs (also called definitional system component IDs) that indicate system components defined by the template and are associated with the ID of the template. The extracting processing unit 1007 extracts, from the template data storage unit 1005, the definitional system component IDs associated with the read template ID (in step S1003). The results of the process performed by the reading processing unit 1003 and the results of the process performed by the extracting processing unit 1007 are output to the specifying processing unit 1009.

Next, the specifying processing unit 1009 specifies the actual system component IDs read by the reading processing unit 1003 and the definitional system component IDs extracted by the extracting processing unit 1007 that match as a common component ID (in step S1005). The result of the process performed by the specifying processing unit 1009 is output to the storage processing unit 1013. The first trouble case data storage unit 1011 has stored therein first trouble case data pieces that each include the ID of an actual system component in which trouble occurred. The storage processing unit 1013 extracts, from the first trouble case data storage unit 1011, a first trouble case data piece that includes the common component ID. Then, the storage processing unit 1013 causes the extracted first trouble case data piece to be stored in the common trouble case data storage unit 1015 (in step S1007).

Among the actual system components of the system built using the template, a system component that is defined by the template is specified as a common component. Data on trouble that occurred in the common component is accumulated. The accumulated failure data can be used for management of another system built using the same template. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

Second Embodiment

Figure 3:
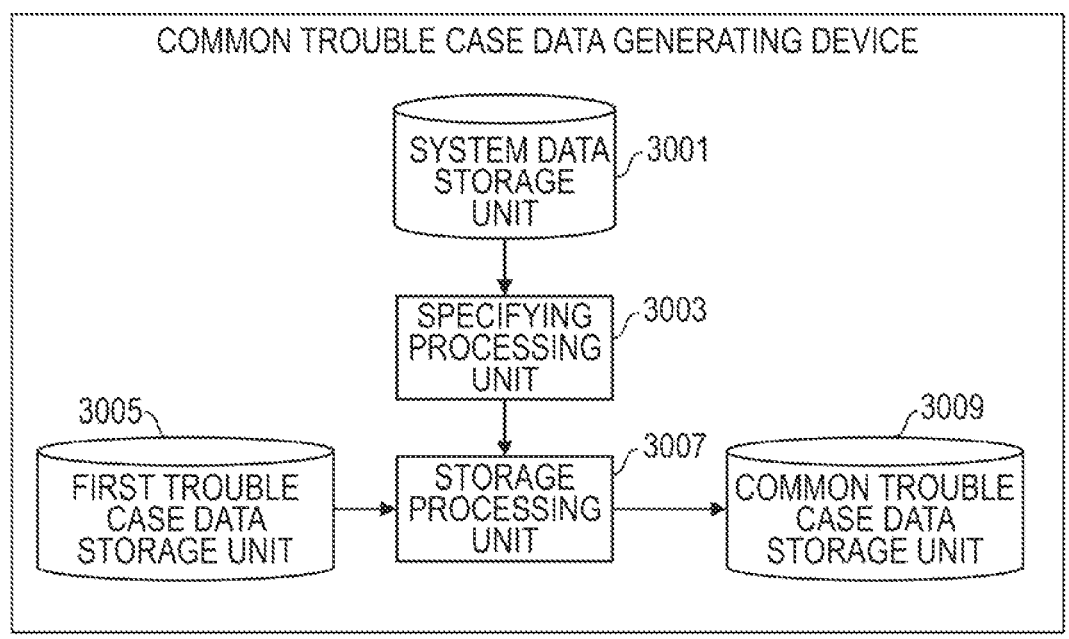
FIG. 3 is a functional block diagram illustrating a common trouble case data generating device according to a second embodiment.

FIG. 3 is a functional block diagram illustrating a common trouble case data generating device according to a second embodiment. The common trouble case data generating device according to the second embodiment includes a system data storage unit 3001, a specifying processing unit 3003, a first trouble case data storage unit 3005, a storage processing unit 3007 and a common trouble case data storage unit 3009. The specifying processing unit 3003 performs a process using data stored in the system data storage unit 3001. The storage processing unit 3007 performs a process using the result of the process performed by the specifying processing unit 3003 and data stored in the first trouble case data storage unit 3005. The storage processing unit 3007 causes the result of the process performed by the storage processing unit 3007 to be stored in the common trouble case data storage unit 3009.

Figure 4:
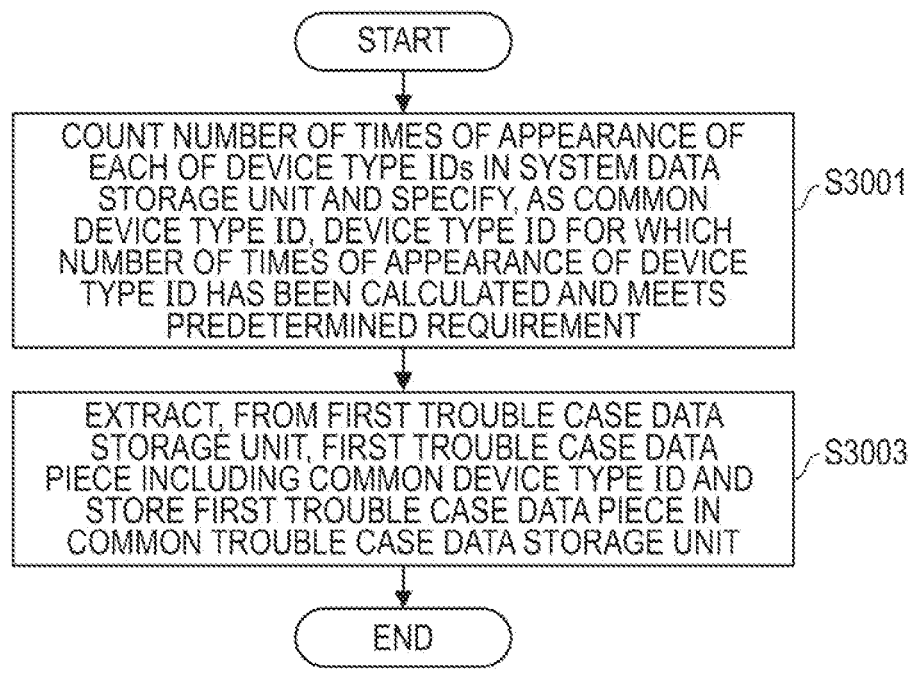
FIG. 4 is a flowchart of a process according to the second embodiment.

Next, the details of a process that is performed by the common trouble case generating device illustrated in FIG. 3 are described with reference to FIG. 4. The system data storage unit has stored therein, for each of systems, device type IDs that indicate the types of devices that are actually used in the system. First, the specifying processing unit 3003 counts the number of times of appearance of each of the device type IDs in the system data storage unit 3001 and specifies, as a common device type ID, a device type ID for which the number of times of appearance of the device type ID has been calculated and meets a predetermined requirement (in step S3001). The result of the process performed by the specifying processing unit 3003 is output to the storage processing unit 3007. The first trouble case data storage unit 3005 has stored therein first trouble case data pieces that each include the ID of the type of a device in which trouble occurred. The storage processing unit 3007 extracts, from the first trouble case data storage unit 3005, a first trouble case data piece that includes the common device type ID and causes the extracted first trouble case data piece to be stored in the common trouble case data storage unit 3009 (in step S3003).

In this manner, a device type ID for which the number of times of appearance of the device type ID has been calculated and meets the predetermined requirement is specified as a common device type ID, and data on trouble that occurred in a device with the common device type ID is accumulated. Thus, the accumulated failure data can be shared between systems that use devices with the common device type ID. Therefore, it is possible to efficiently manage the systems. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

Third Embodiment

Next, a third embodiment is described. First, system building using a template is described with reference to FIG. 5. The template defines information that is necessary for the system building. For example, the template defines system components that are used in a system and necessary to provide specific services, and defines connection relationships of the system components that are used in the system. The template does not include specific information (for example, an Internet Protocol (IP) address and a host name) that is set for each tenant.

Figure 5:
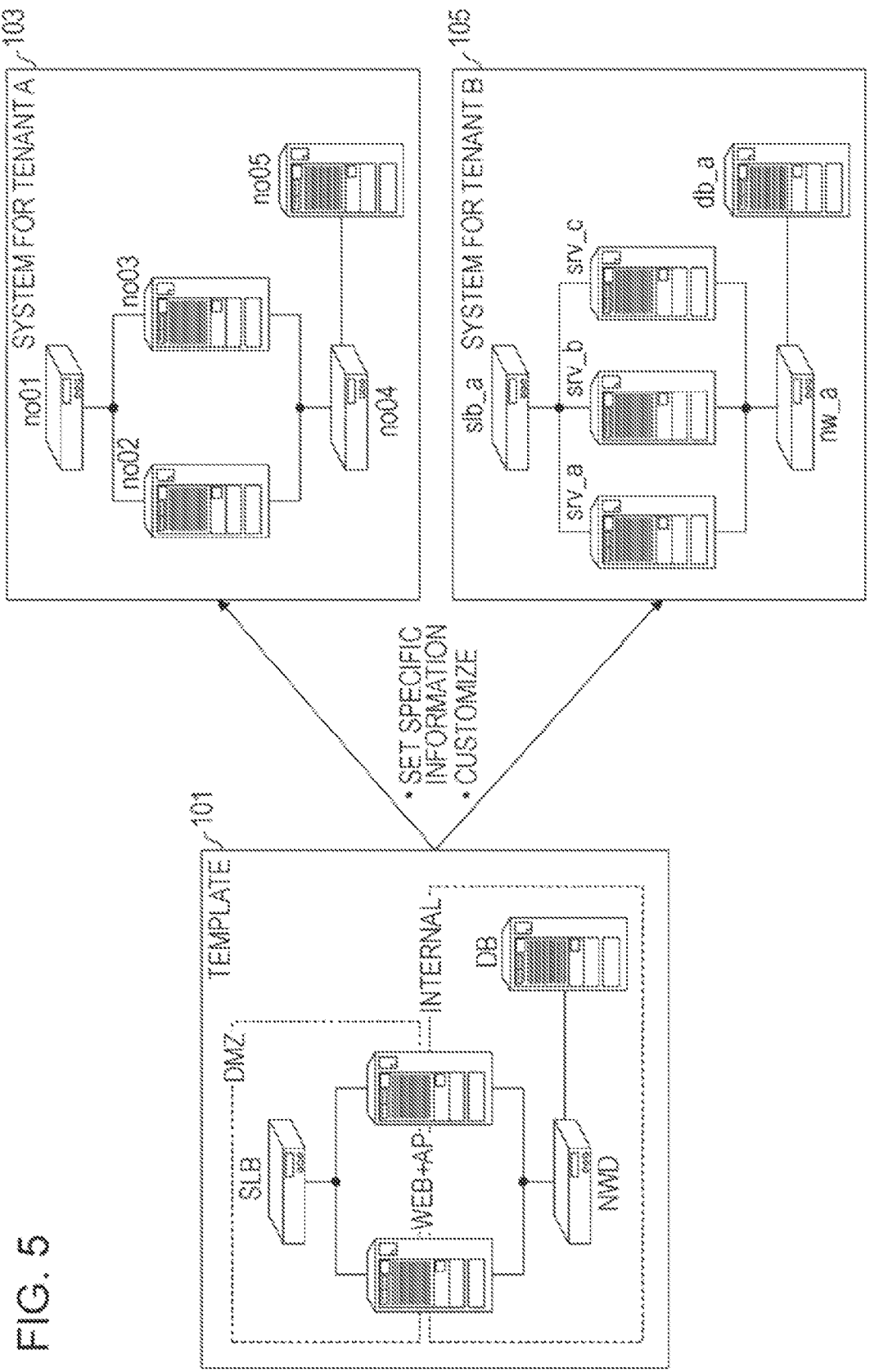
FIG. 5 is a diagram illustrating an example described in a third embodiment.

In an example illustrated in FIG. 5, a template 101 is used so that a system 103 for a tenant A and a system 105 for a tenant B are built. In the template 101, a server load balancer, two servers (that each provides a web server function and an application server function), a network device, and a database server are defined as system components. In the template illustrated in FIG. 5, a demilitarized zone (DMZ) and an internal network are defined. Specific information is set for each of the tenants in the template 101, and the systems are customized (for example, the number of servers or an application to be installed is changed) on the basis of the template 101 when necessary and thereby completed. In the example illustrated in FIG. 5, the system 105 for the tenant B is customized so that one server is added to the system 105. Since the template is prepared in advance, the systems that have necessary functions can be reliably built for a short time.

Figure 6:
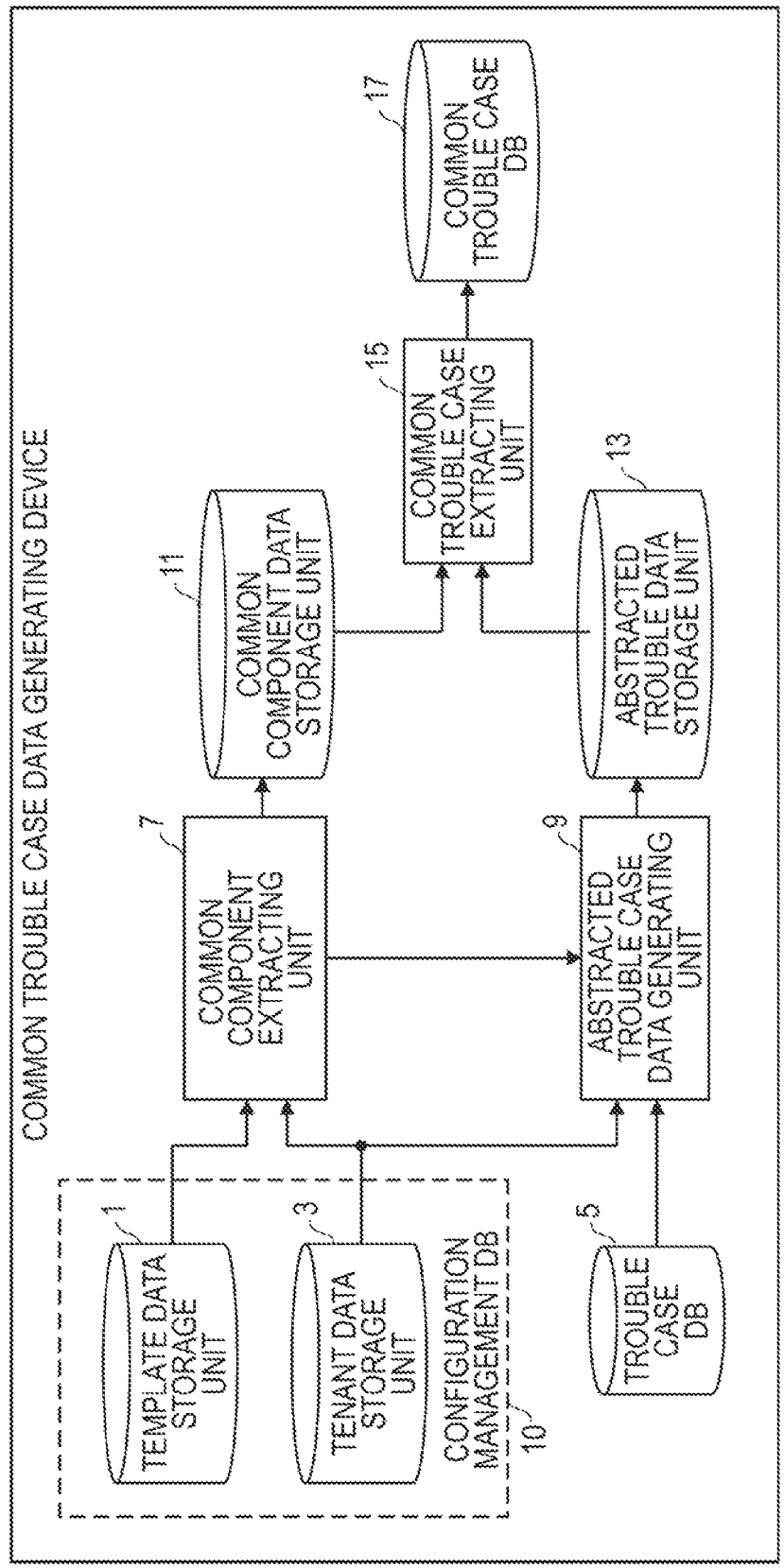
FIG. 6 is a functional block diagram illustrating a common trouble case data generating device according to the third embodiment.

FIG. 6 is a functional block diagram illustrating a common trouble case data generating device according to the third embodiment. The common trouble case data generating device according to the third embodiment includes a configuration management database (DB) 10, a trouble case database (DB) 5, a common component extracting unit 7, an abstracted trouble case data generating unit 9, a common component data storage unit 11, an abstracted trouble case data storage unit 13, a common trouble case data extracting unit 15 and a common trouble case database (DB) 17. The configuration management DB 10 includes a template data storage unit 1 and a tenant data storage unit 3.

The common component extracting unit 7 performs a process using data stored in the template data storage unit 1 and data stored in the tenant data storage unit 3 and causes the result of the process to be stored in the common component data storage unit 11. The abstracted trouble case data generating unit 9 performs a process using the data stored in the tenant data storage unit 3 and data stored in the trouble case DB 5 and causes the result of the process to be stored in the abstracted trouble case data storage unit 13. The common trouble case extracting unit 15 performs a process using data stored in the common component data storage unit 11 and data stored in the abstracted trouble case data storage unit 13 and causes the result of the process to be stored in the common trouble case DB 17.

FIGS. 7 and 8 illustrate examples of device type tables that are stored in the template data storage unit 1. In each of the examples illustrated in FIGS. 7 and 8, information such as a device type ID, a device type, an operation system (OS), a central processing unit (CPU), a memory, a hard disk, software, a file and the like is registered in the device type table. In the example illustrated in FIG. 7, data on specifications of a device with a device type ID "TMPL_WEB_01" is registered in the device type table. In the example illustrated in FIG. 8, data on specifications of a device with a device type ID "TMPL_DB_01" is registered in the device type table. The device type tables are prepared for device type IDs, respectively.

FIG. 9 illustrates an example of component tables that are stored in the template data storage unit 1. In the example illustrated in FIG. 9, a list ID, system component IDs and device type IDs are registered in the component table. The system component IDs are provided to identify the system components (for example, a server, a switch and the like) that are included in a system. The system components are also called configuration items (CIs). The device type IDs are provided to identify the types of devices as described above with reference to FIGS. 7 and 8. The component tables are prepared for list IDs, respectively.

FIG. 10 illustrates an example of connection tables that are stored in the template data storage unit 1. In the example illustrated in FIG. 10, a connection relationship ID, connection IDs, start points, end points and regions are registered in the connection table. For example, data that is included in the first line of the connection table indicates that a system component with a system component ID "SLB01" and a system component with a system component ID "SW01" are connected to each other by a connection with a connection ID "LINK01" and included in a region "DMZ". The connection tables are prepared for connection relationship IDs, respectively.

Templates include: templates (refer to FIGS. 7 and 8) that define specifications of devices; a template (refer to FIG. 9) that defines system components that are used in a system; and a template (refer to FIG. 10) that defines connection relationships of system components of a system. The present embodiment describes a process that is performed using a template that defines system components that are used in a system.

FIG. 15 illustrates an example of component setting tables that are stored in the tenant data storage unit 3. In the example illustrated in FIG. 15, a list ID, system components IDs, system component names, and instance IDs are registered in the component setting table. The instance IDs are provided to identify settings for the system components. The details of the settings are registered in device type setting tables as illustrated in FIGS. 11 to 14B. The component setting tables are prepared for the systems, respectively. The example illustrated in FIG. 15 indicates that a system is built using a template with a list ID "TMPL_LIST_01". The list of the system components, which is illustrated in FIG. 9, does not include a system component with a system component ID "SVR04". This indicates that a new system component is added to the system example illustrated in FIG. 15 and that the system component ID "SVR04" is assigned to the added system component. In the present embodiment, when a system component is added or when a setting for a system component is changed (for example, an application to be installed is changed), a new system component ID is assigned to the system component. It is, therefore, possible to determine whether or not the system components that are used in the system are included in system components defined by the template. The system component names are specific names to identify the system components. For example, names that can be easily identified by tenants that use the system are set as the system component names. Thus, even when system components that have the same system component ID are present in multiple systems built using the same template, the names of the system components are not necessarily the same.

FIGS. 11 to 14B illustrate examples of the device type setting tables that are stored in the tenant data storage unit 3. In each of the examples illustrated in FIGS. 11 to 14B, an instance ID and a device type ID are registered in the device type setting table. As illustrated in FIG. 12, information on a setting for a file is registered in the device type setting table in some cases.

FIG. 16 illustrates an example of connection setting tables that are stored in the tenant data storage unit 3. In the example illustrated in FIG. 16, a connection relationship ID, connection IDs, start points, end points, and regions are registered in the connection setting table. The connection setting tables are prepared for the systems, respectively. The example illustrated in FIG. 16 indicates that the system is built using the template with a connection relationship ID "TEMP_LINK_01".

FIG. 17 illustrates an example of network setting tables that are stored in the tenant data storage unit 3. In the example illustrated in FIG. 17, the network setting table includes a column for regions and a column for IP addresses. The network setting tables are prepared for the systems, respectively.

FIG. 18 illustrates an example of data that is stored in the trouble case DB 5. In the example illustrated in FIG. 18, the data includes a column for numbers, a column for dates and times of trouble, a column for details of the trouble, a column for names (also called cause system component names) of system components causing the trouble, and a column for the causes of the trouble. Such data as illustrated in FIG. 18 is prepared for each of the systems.

The tables and the like, which are illustrated in FIGS. 7 to 18, are prepared by, for example, a user who operates the trouble case data generating device.

Figure 19:
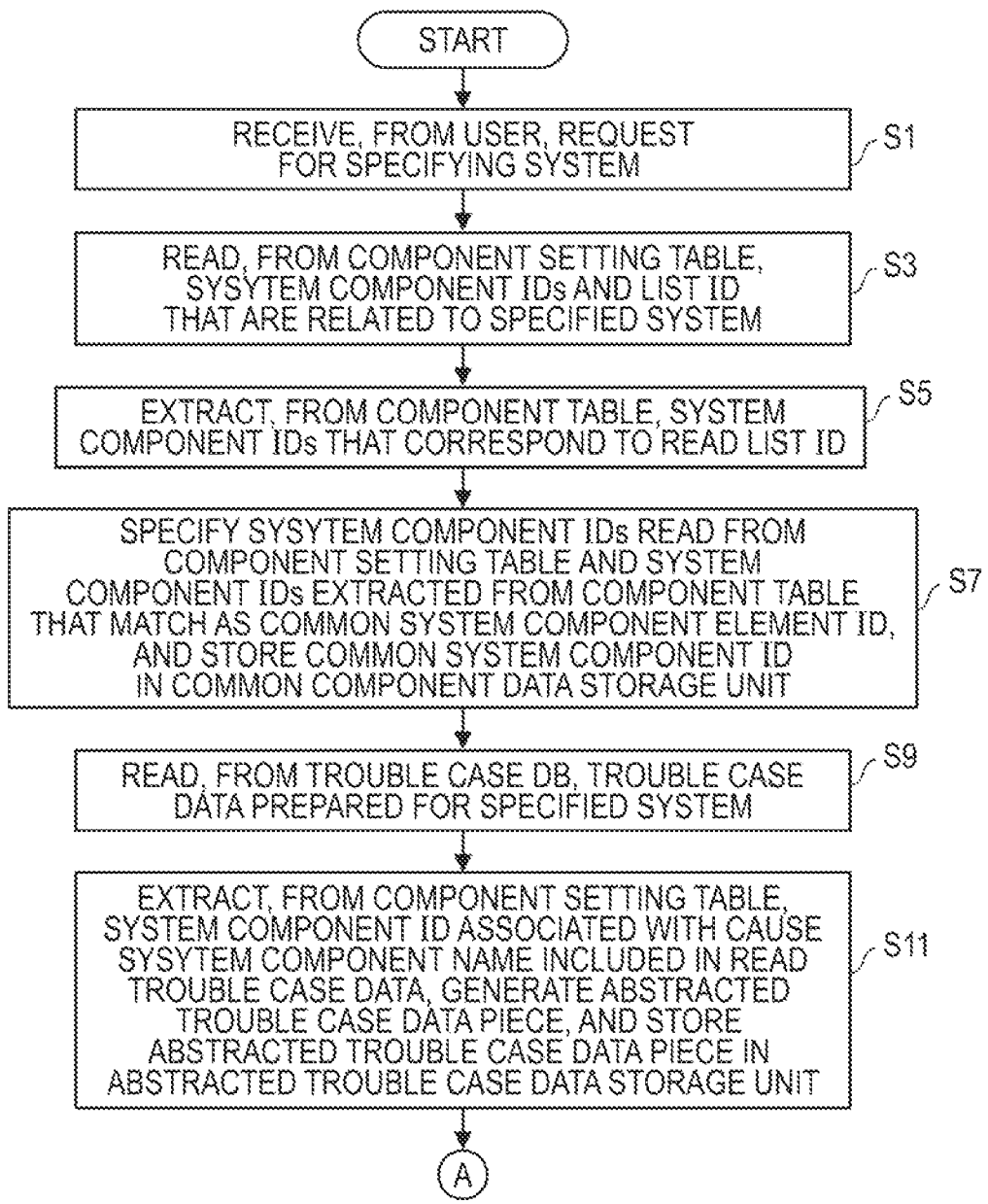
FIG. 19 is a flowchart of a process according to the third embodiment.

Next, the details of a process that is performed by the trouble case data generating device illustrated in FIG. 6 are described with reference to FIGS. 19 to 21. First, the common component extracting unit 7 receives a process request from the user who operates the trouble case data generating device (in step S1 illustrated in FIG. 19). The process request includes a request for specifying a system. In step S1, the common component extracting unit 7 outputs the process request to the abstracted trouble case data generating unit 9. Step S1 may not be performed, and the following process may be performed for a system after a predetermined time elapses after the previous process is performed.

Next, the common component extracting unit 7 reads, from the component setting table (refer to FIG. 15) prepared for the system specified in step S1, system component IDs and a list ID that are related to the system specified in step S1, and stores the read system component IDs and the read list ID in a storage device such as a main memory (in step S3). In addition, the common component extracting unit 7 extracts, from the component table (refer to FIG. 9) prepared for the read list ID, system components IDs that correspond to the read list ID, and stores the read system components IDs in the storage device such as the main memory (in step S5).

The common component extracting unit 7 specifies the system component IDs read in step S3 and the system component IDs extracted in step S5 that match as a common system component ID, and causes the common system component ID to be stored in the common component data storage unit 11 (in step 7).

The abstracted trouble case data generating unit 9 reads, from the trouble case DB 5 (refer to FIG. 18), trouble case data prepared for the system specified in the process request (in step S9). Then, the abstracted trouble case data generating unit 9 extracts, from the component setting table (refer to FIG. 15) prepared for the system specified in the process request, a system component ID associated with a cause system component name included in the read trouble case data, generates an abstracted trouble case data piece including the extracted system component ID and the read trouble case data, and causes the abstracted trouble case data piece to be stored in the abstracted trouble case data storage unit 13 (in step S11). After step S11, the process proceeds to step S13 (illustrated in FIG. 21).

FIG. 20A illustrates an example of the data stored in the abstracted trouble case data storage unit 13. In the example illustrated in FIG. 20A, the data includes a column for numbers, a column for dates and times of trouble, a column for the details of the trouble, a column for names (also called cause system component names) of system components causing the trouble, a column for IDs (also called cause system component IDs) of system components causing the trouble, and a column for the causes of the trouble. The data stored in the abstracted trouble case data storage unit 13 is obtained by adding the cause system component IDs to the data (refer to FIG. 18) stored in the trouble case DB 5. As described with reference to FIG. 15, as the system component names, names that can be easily identified by tenants that use the system are set, for example. Thus, even when system components that have the same system component ID are present in multiple systems built using the same template, the names of the system components are not necessarily the same depending on the systems. On the other hand, the IDs of the system components that are present in the multiple systems are the same when the systems are built using the same template. Since the abstracted trouble case data piece is generated, an administrator of another system built using the same template can find out the system component in which trouble occurred.

Figure 21:
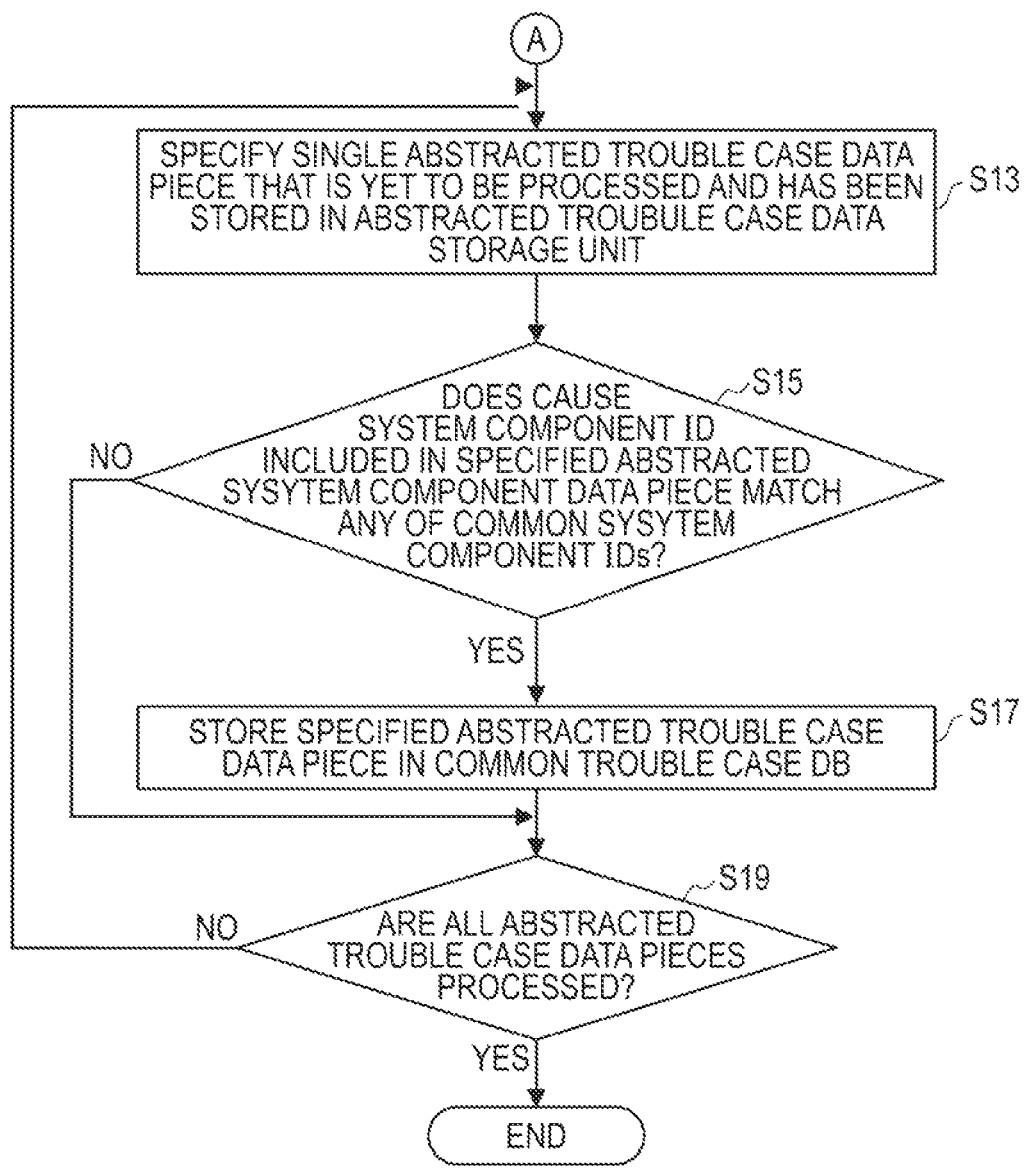
FIG. 21 is a flowchart of a process according to the third embodiment.

Referring to FIG. 21, the common trouble case extracting unit 15 specifies a single abstracted trouble case data piece that has been stored in the abstracted trouble case data storage unit 13 and is yet to be processed (in step S13 illustrated in FIG. 21). Then, the common trouble case extracting unit 15 determines whether or not a cause system component ID included in the specified abstracted trouble case data piece matches any of system component IDs stored in the common component data storage unit 11 (in step S15).

When the cause system component ID included in the specified abstracted trouble case data piece matches any of the system component IDs stored in the common component data storage unit 11 (Yes in step S15), the common trouble case extracting unit 15 causes the abstracted trouble case data piece specified in step S13 to be stored in the common trouble case DB 17 (in step S17). On the other hand, when the cause system component ID included in the specified abstracted trouble case data piece does not match any of the system component IDs stored in the common component data storage unit 11 (No in step S15), the process proceeds to step S19.

Then, the common trouble case extracting unit 15 determines whether or not all abstracted trouble case data pieces are processed (in step S19). When any of all the abstracted trouble case data pieces is yet to be processed (No in step S19), the process proceeds to step S13 in order to process the next abstracted trouble case data piece. On the other hand, when all the abstracted trouble case data pieces are processed (Yes in step S19), the process is terminated.

By performing the process, it is possible to accumulate trouble case data on trouble that occurred in a system component that has been defined by a template used to build a system and is actually used in the system. The accumulated trouble case data indicates the system component that is not customized. Thus, the accumulated trouble case data is useful for another system built using the same template. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

Fourth Embodiment

Figure 22:
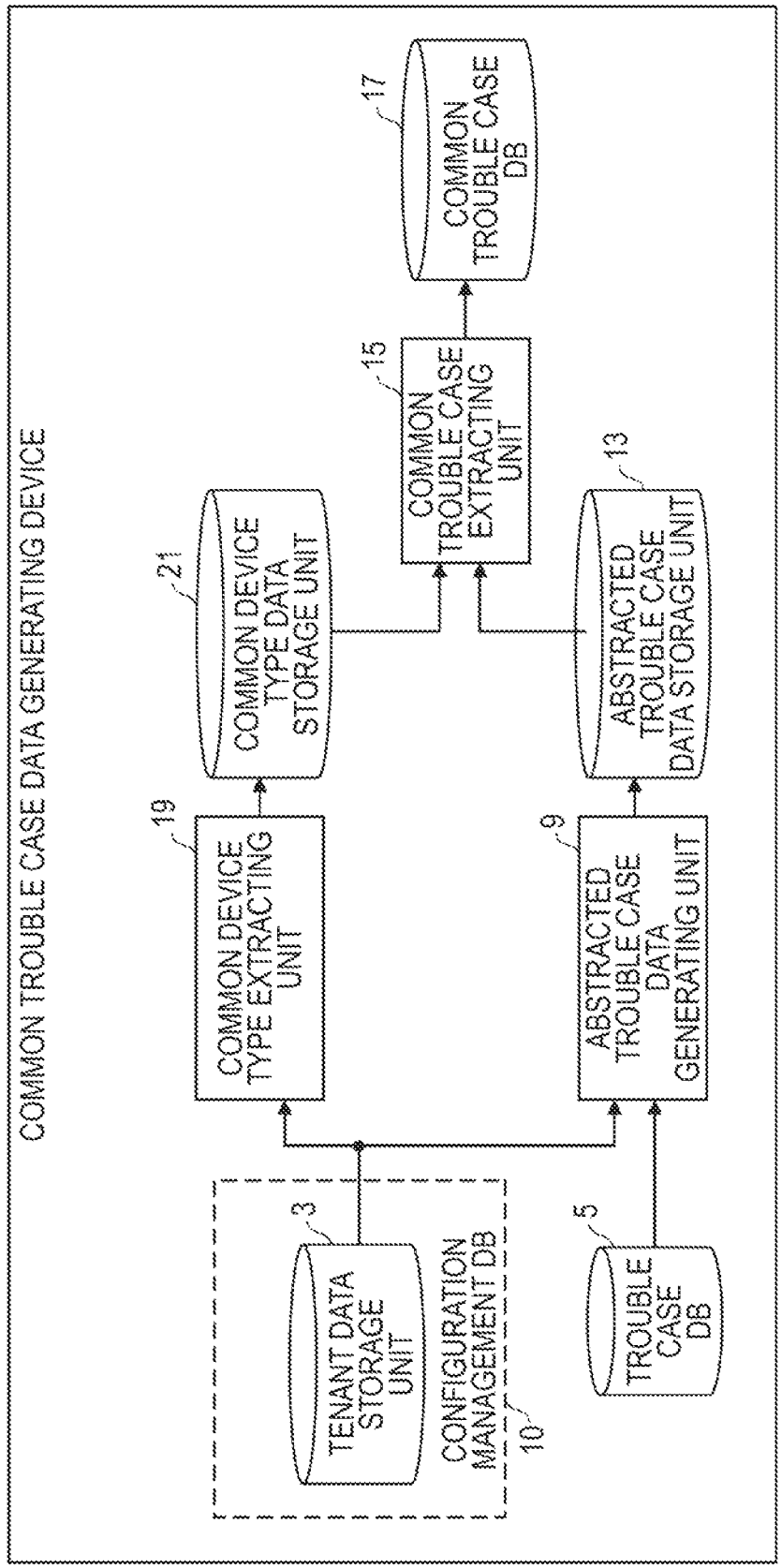
FIG. 22 is a functional block diagram illustrating a common trouble case data generating device according to a fourth embodiment.

FIG. 22 is a functional block diagram illustrating a common trouble case data generating device according to a fourth embodiment. Processing units indicated by the same reference numerals as in FIG. 6 and data storage units indicated by the same reference numerals as in FIG. 6 have the same functions as in the third embodiment. A common device type data storage unit 21 has the same function as the common component data storage unit 11.

The common trouble case data generating device according to the fourth embodiment includes a configuration management database (DB) 10, a trouble case database (DB) 5, a common device type extracting unit 19, an abstracted trouble case data generating unit 9, a common device type data storage unit 21, an abstracted trouble case data unit 13, a common trouble case extracting unit 15 and a common trouble case database (DB) 17. The configuration management DB 10 includes a tenant data storage unit 3 and is different from the third embodiment in that the configuration management DB 10 does not include the template data storage unit 1.

The common device type extracting unit 19 performs a process using data stored in the tenant data storage unit 3 and causes the results of the process to be stored in the common device type data storage unit 21. The abstracted trouble case data generating unit 9 performs a process using the data stored in the tenant data storage unit 3 and data stored in the trouble case DB 5 and causes the result of the process to be stored in the abstracted trouble case data storage unit 13. The common trouble case extracting unit 15 performs a process using data stored in the common device type data storage unit 21 and data stored in the abstracted trouble case data storage unit 13 and causes the result of the process to be stored in the common trouble case DB 17.

Figure 23:
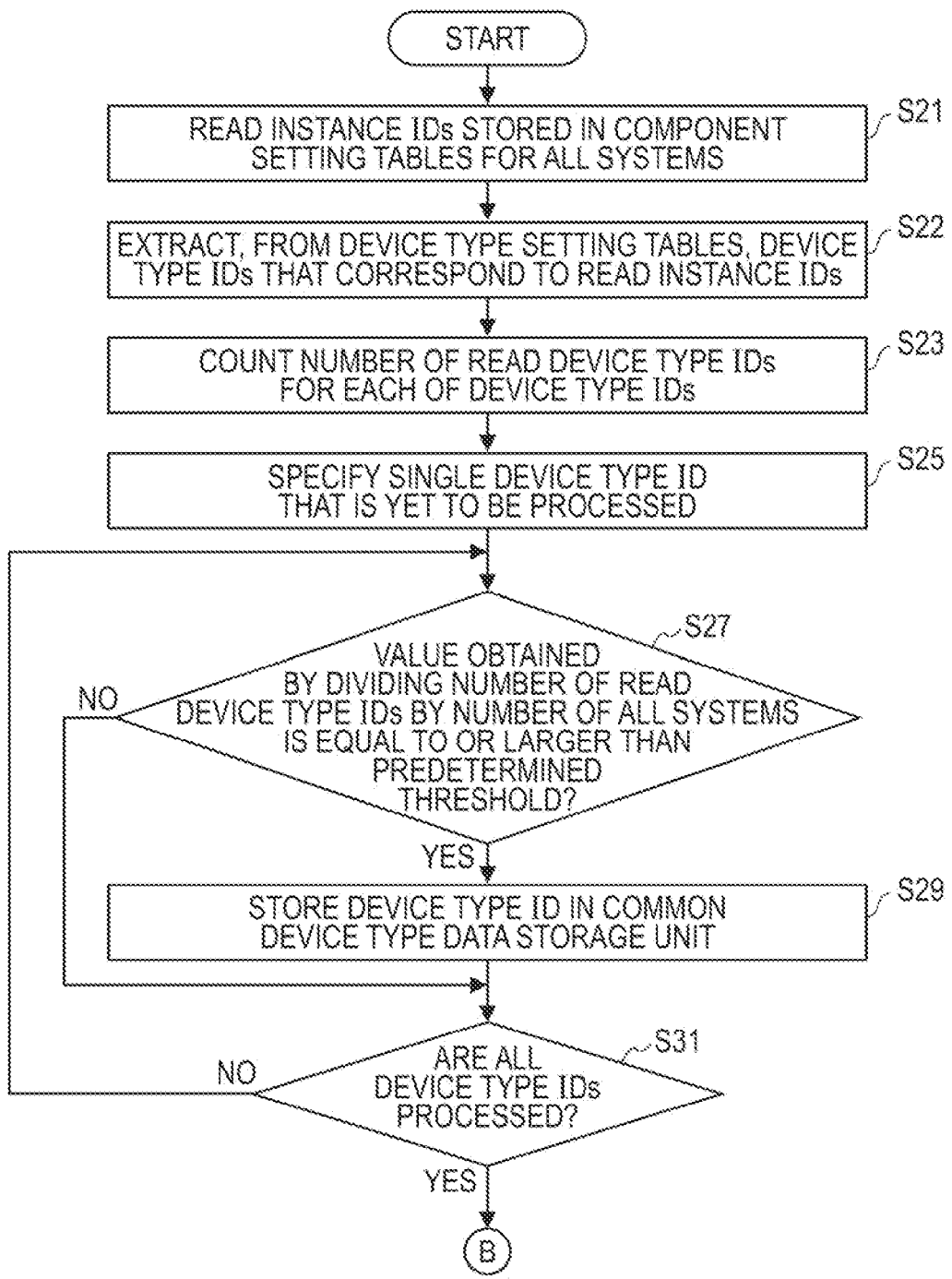
FIG. 23 is a flowchart of a process according to the fourth embodiment.

Next, the details of a process that is performed by the common trouble case data generating device illustrated in FIG. 22 are described with reference to FIGS. 23 and 24. First, the common device type extracting unit 19 reads instance IDs included in the component setting tables (refer to FIG. 15) for all systems and stores the read instance IDs in a storage device such as a main memory (in step S21 illustrated in FIG. 23). In addition, the common device type extracting unit 19 extracts, from the device type setting tables, device type IDs corresponding to the read instance IDs and stores the extracted device type IDs in the storage device such as the main memory (in step S22). In addition, the common device type extracting unit 19 counts the number of the extracted device type IDs for each of the device type IDs and stores the counting results in the storage device such as the main memory (in step S23).

Then, the common device type extracting unit 19 specifies a single device type ID that is yet to be processed (in step S25). In addition, the common device type extracting unit 19 calculates a value by dividing the number of the read device type IDs by the number of all the systems for the device type ID specified in step S25 and determines whether or not the calculated value is equal to or larger than a predetermined threshold (in step S27). The number of all the systems is specified by counting the number of the component setting tables stored in the tenant data storage unit 3, for example.

When the calculated value is equal to or larger than the predetermined threshold (YES in step S27), the common device type extracting unit 19 causes the device type ID specified in step S25 to be stored in the common device type data storage unit 21 (in step S29). On the other hand, when the calculated value is smaller than the predetermined threshold (No in step S27), the process proceeds to step S31.

Then, the common device type extracting unit 19 determines whether or not all the device type IDs are processed (in step S31). When any of all the device type IDs is yet to be processed (No in step S31), the process returns to step S27 in order to process the next device type ID. On the other hand, when all the device type IDs are processed (Yes in step S31), the process proceeds to step S33 (illustrated in FIG. 24).

Figure 24:
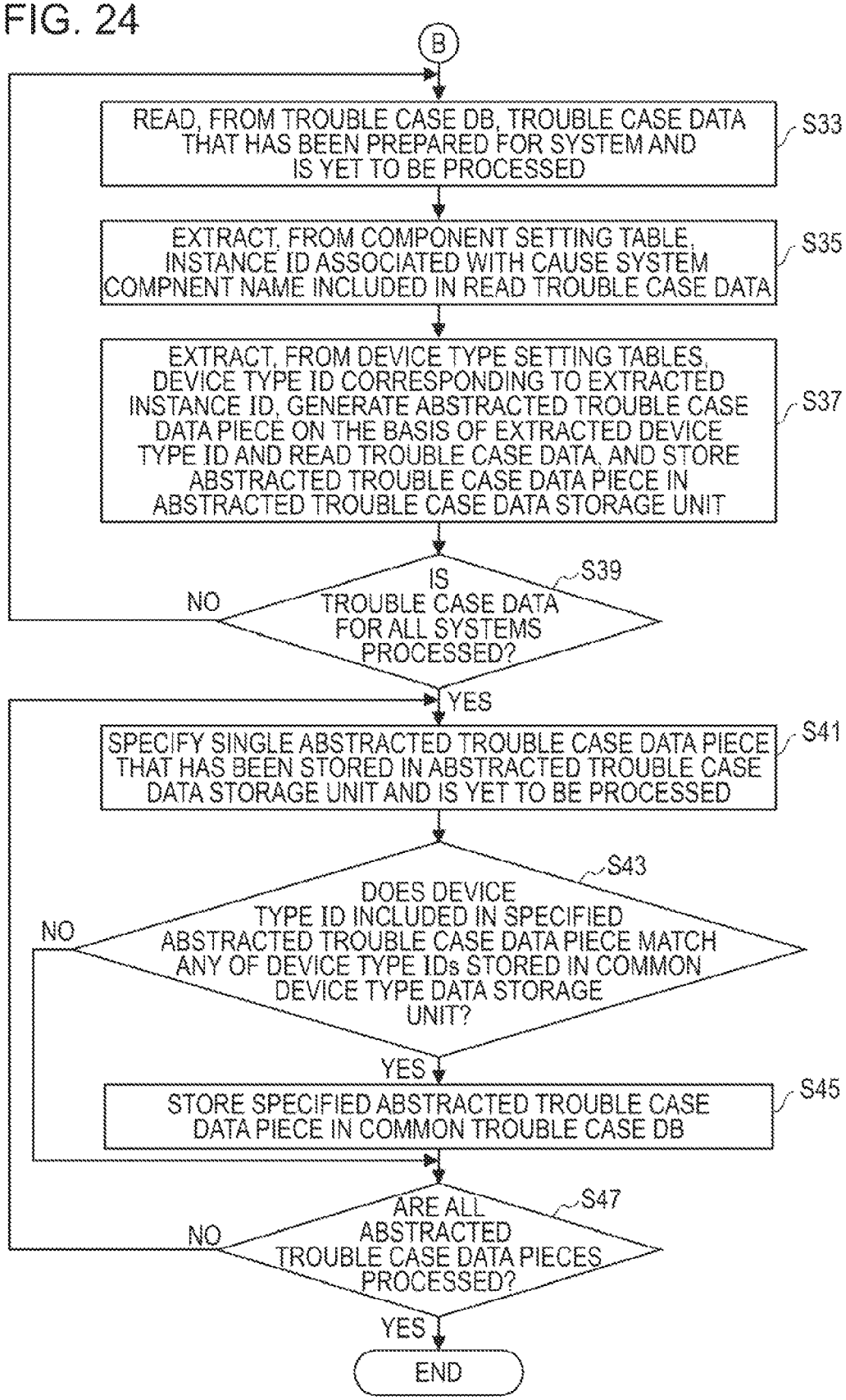
FIG. 24 is a flowchart of the process according to the fourth embodiment.

Referring to FIG. 24, the abstracted trouble case data generating unit 9 reads, from among trouble case data that has been prepared for each of the systems and registered in the trouble case DB (refer to FIG. 18), trouble case data that is yet to be processed and has been prepared for a certain system among the systems (in step S33 illustrated in FIG. 24). Then, the abstracted trouble case data generating unit 9 extracts, from the component setting table (refer to FIG. 15) prepared for the certain system, an instance ID associated with a cause system component name included in the read trouble case data (in step S35). In addition, the abstracted trouble case data generating unit 9 extracts a device type ID corresponding to the extracted instance ID from the device type setting tables, generates an abstracted trouble case data piece including the extracted device type ID and the trouble case data read in step S33, and causes the abstracted trouble case data piece to be stored in the abstracted trouble case data storage unit 13 (in step S37).

FIG. 20B illustrates an example of the abstracted trouble case data piece stored in the abstracted trouble case data storage unit 13. In the example illustrated in FIG. 20B, the abstracted trouble case data piece includes a column for numbers, a column for dates and times of trouble, a column for the details of the trouble, a column for names (also called cause system component names) of system components causing the trouble, a column for device type IDs (also called cause device type IDs) of devices causing the trouble, and a column for the causes of the trouble. The format of the abstracted trouble case data piece generated in step S37 is the same as the format of the abstracted trouble case data piece illustrated in FIG. 20A. However, the abstracted trouble case data piece generated in step S37 includes the column for device type IDs of devices causing trouble instead of the column for IDs of system components causing trouble.

Referring to FIG. 24, the abstracted trouble case data generating unit 9 determines whether or not the trouble case data prepared for all the systems is processed (in step S39). When any of the trouble case data prepared for all the systems is not yet to be processed (No in step S39), the process returns to step S33 in order to process trouble case data prepared for the next system.

On the other hand, when the trouble case data prepared for all the systems is processed (Yes in step S39), the common trouble case extracting unit 15 specifies a single abstracted trouble case data piece that has been stored in the abstracted trouble case data storage unit 13 and is yet to be processed (in step S41). Then, the common trouble case extracting unit 15 determines whether or not a device type ID included in the specified abstracted trouble case data piece matches any of device type IDs stored in the common device type data storage unit 21 (in step S43). When the device type ID included in the specified abstracted trouble case data piece matches any of the device type IDs stored in the common device type data storage unit 21 (Yes in step S43), the common trouble case extracting unit 15 causes the abstracted trouble case data piece specified in step S41 to be stored in the common trouble case DB 17 (in step S45). On the other hand, when the device type ID included in the specified abstracted trouble case data piece does not match any of the device type IDs stored in the common device type data storage unit 21 (Yes in step S43), the process proceeds to step S47.

Then, the common trouble case extracting unit 15 determines whether or not all abstracted trouble case data pieces are processed (in step S47). When any of all the abstracted trouble case data pieces is yet to be processed (in step S47), the process returns to step S41 in order to process the next abstracted trouble case data piece. On the other hand, when all the abstracted trouble case data pieces are processed (Yes in step S47), the process is terminated.

By performing the process, it is possible to accumulate data on trouble that occurred in devices of the same type (for example, devices of the same type that are used in many systems) that meet a predetermined requirement. Thus, the accumulated failure data can be used for the systems that use the devices of the same type, and it is possible to efficiently manage the systems that use the devices of the same type. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

Fifth Embodiment

Figure 25:
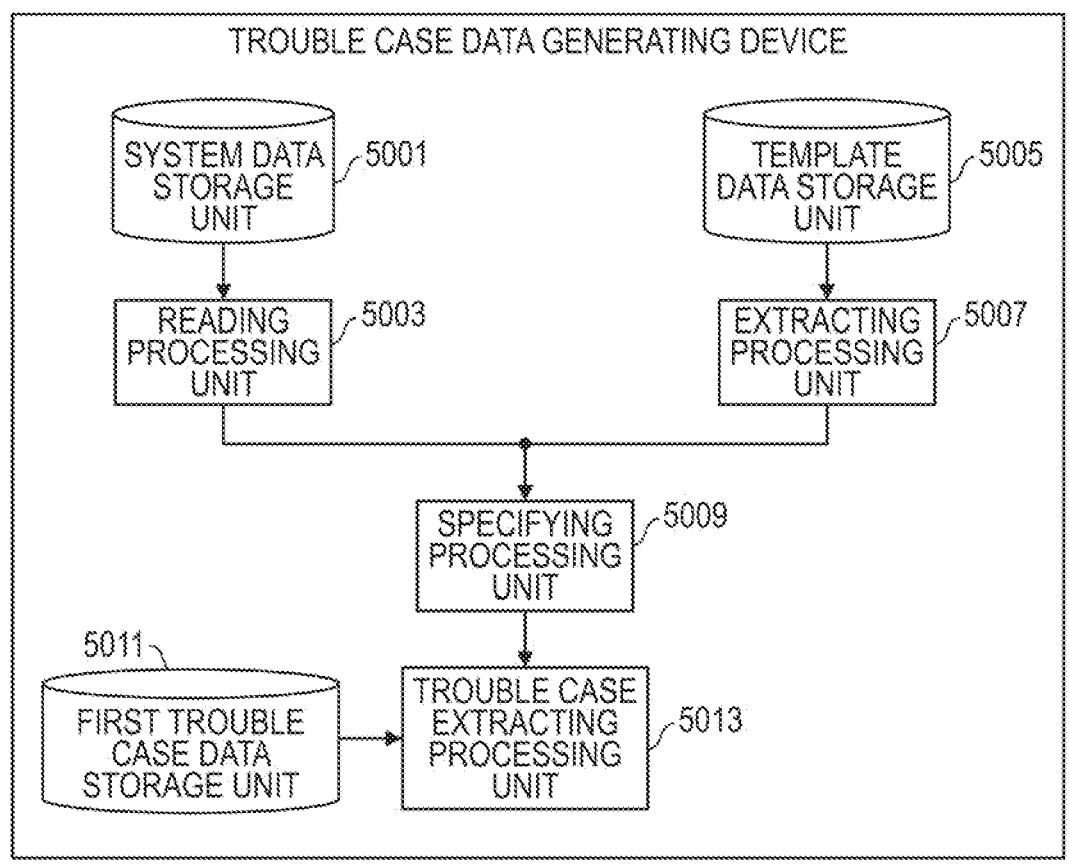
FIG. 25 is a functional block diagram illustrating a common trouble case data generating device according to a fifth embodiment.
Figure 26:
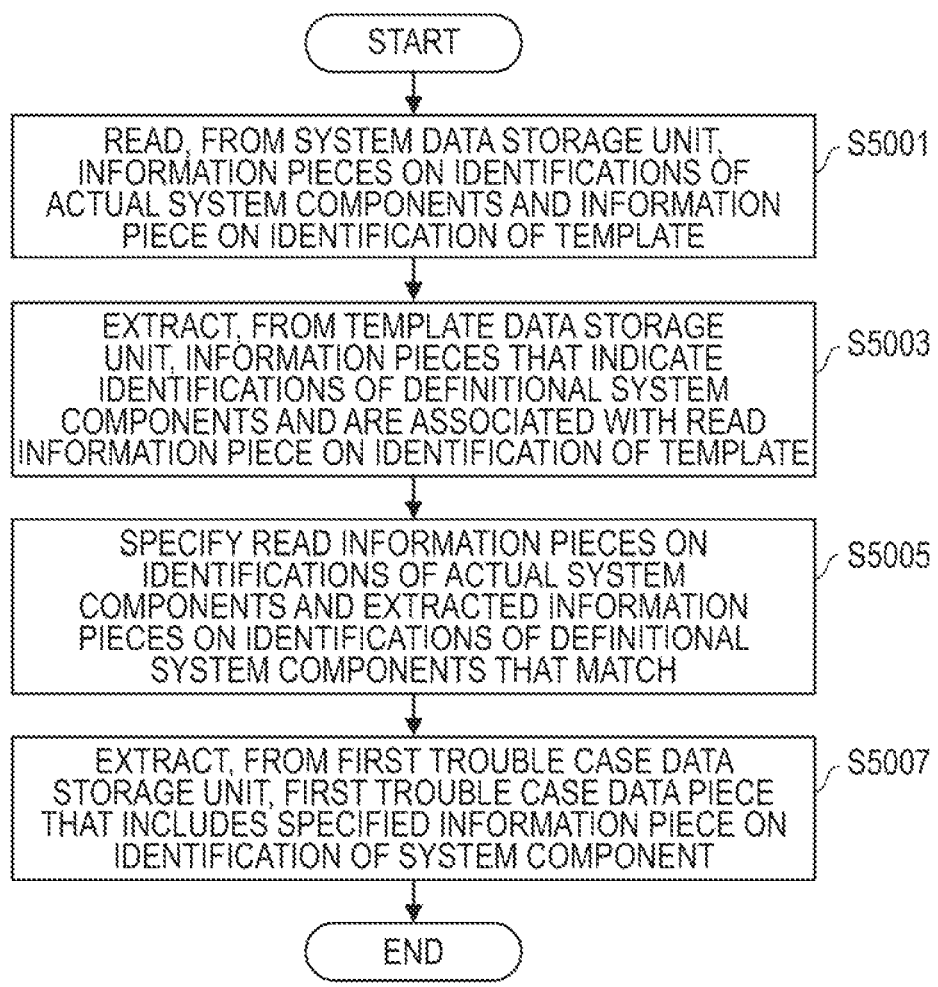
FIG. 26 is a flowchart of a process according to the fifth embodiment.

FIG. 25 is a functional block diagram illustrating a trouble case data generating device according to a fifth embodiment. The trouble case data generating device according to the fifth embodiment includes a system data storage unit 5001, a reading processing unit 5003, a template data storage unit 5005, an extracting processing unit 5007, a specifying processing unit 5009, a first trouble case data storage unit 5011 and a trouble case extracting processing unit 5013. The reading processing unit 5003 performs a process using data stored in the system data storage unit 5001. The extracting processing unit 5007 performs a process using data stored in the template data storage unit 5005. The specifying processing unit 5009 performs a process using the results of the process performed by the reading processing unit 5003 and the results of the process performed by the extracting processing unit 5007. The trouble case extracting processing unit 5013 performs a process using the result of the process performed by the specifying processing unit 5009 and data stored in the first trouble case data storage unit 5011.

Next, the details of a process that is performed by the trouble case data generating device illustrated in FIG. 25 are described. The system data storage unit 5001 has stored therein information pieces on the identifications of system components (actual system components) that are used in a system and an information piece on the identification of a template used to build the system. First, the reading processing unit 5003 reads, from the system data storage unit 5001, the information pieces on the identifications of the system components of the system and the information piece on the identification of the template used to build to the system (in step S5001). The template data storage unit 5005 has stored therein information pieces that indicate the identifications of system components defined by the template and are associated with the information piece on the identification of the template. Then, the extracting processing unit 5007 extracts, from the template data storage unit 5005, information pieces that indicate the identifications of the system components defined by the template used to build the system and are associated with the information piece that indicates the identification of the template and has been read in step S5001 (in step S5003). The results of the process performed by the reading processing unit 5003 and the results of the process performed by the extracting processing unit 5007 are output to the specifying processing unit 5009.

Next, the specifying processing unit 5009 specifies the information pieces (on the identifications of the system components) read by the reading processing unit 5003 and the information pieces (on the identifications of the definitional system components) extracted by the extracting processing unit 5007 that match (in step S5005). The result of the process performed by the specifying processing unit 5009 is output to the trouble case extracting processing unit 5013. The first trouble case data storage unit 5011 has stored therein first trouble case data pieces that each include an information piece on the identification of a system component in which trouble occurred. Then, the trouble case extracting processing unit 5013 extracts, from the first trouble case data storage unit 5011, a first trouble case data piece that includes the information piece (on the identification of the system component) specified in step S5005 (in step S5007).

In this manner, a system component defined by a template is specified from among actual system components that are used in a system built using the template, and data on trouble that occurred in the specified system component is accumulated. Thus, the accumulated data can be used to manage another system built using the same template. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

Sixth Embodiment

Figure 27:
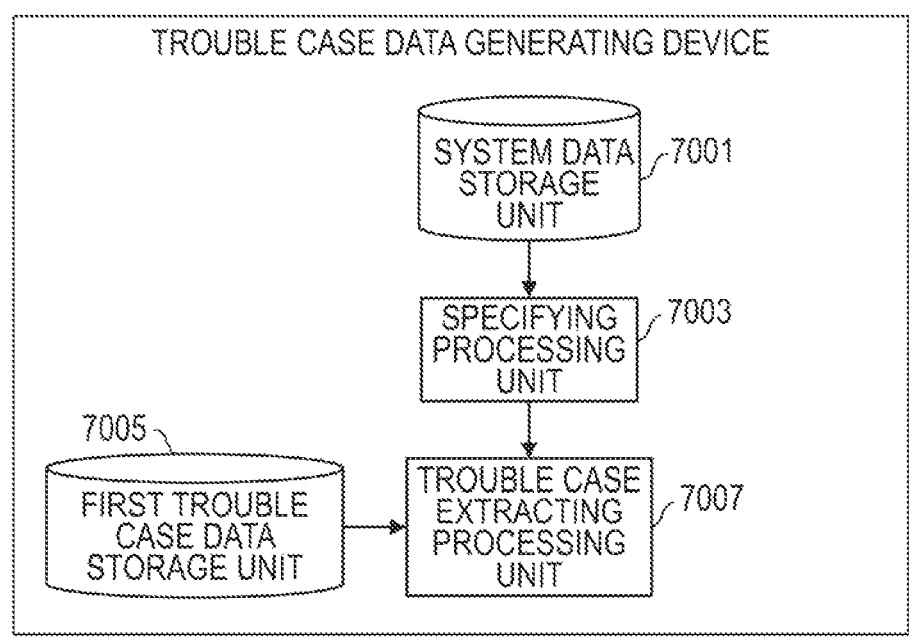
FIG. 27 is a functional block diagram illustrating a common trouble case data generating device according to a sixth embodiment.

FIG. 27 is a functional block diagram illustrating a trouble case data generating device according to a sixth embodiment.

The trouble case data generating device according to the sixth embodiment includes a system data storage unit 7001, a specifying processing unit 7003, a first trouble case data storage unit 7005 and a trouble case extracting processing unit 7007. The specifying processing unit 7003 performs a process using data stored in the system data storage unit 7001. The trouble case extracting processing unit 7007 performs a process using the result of the process performed by the specifying processing unit 7003 and data stored in the first trouble case data storage unit 7005.

Figure 28:
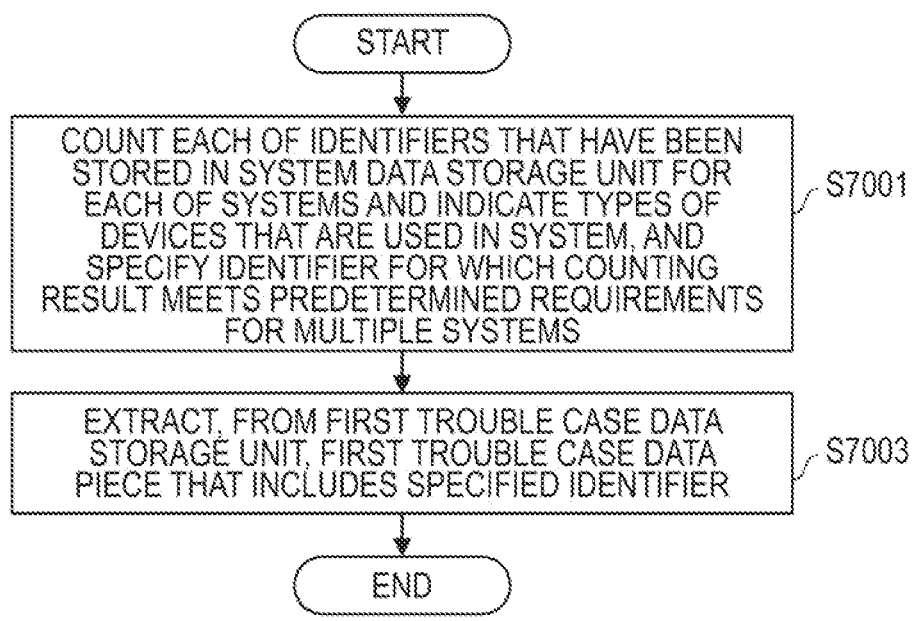
FIG. 28 is a flowchart of a process according to the sixth embodiment.

Next, the details of a process that is performed by the trouble case data generating device illustrated in FIG. 27 are described with reference to FIG. 28. The system data storage unit 7001 has stored therein, for each of systems, identifiers that indicate the types of devices that are used in the system. First, the specifying processing unit 7003 counts each of the identifiers stored in the system data storage unit 7001 and specifies an identifier for which the counting result meets predetermined requirements for multiple systems (in step S7001). The result of the process performed by the specifying processing unit 3003 is output to the trouble case extracting processing unit 7007. The first trouble case data storage unit 7005 has stored therein first trouble case data pieces that each include the identifier of a device in which trouble occurred. Then, the trouble case extracting processing unit 7007 extracts, from the first trouble case data storage unit 7005, a first trouble case data piece that includes the identifier specified in step S7001 (in step S7003).

In this manner, the type of a device that meets predetermined requirements for multiple systems is specified, and data on trouble that occurred in the device of the specified type is accumulated. The accumulated data can be shared between systems in which devices of the specified type are used. Thus, it is possible to efficiently manage plural systems.

Also, because the necessary data is selectively stored in the common trouble case data storage unit, the maintenance of the common trouble case data storage unit such as the deletion of the unnecessary data becomes easier. Further, it is possible to prevent the size of the accumulated failure data from getting excessively larger, and thus the cost of management of the common trouble case data storage unit can be reduced.

The embodiments of the present technique are described above, and the technique is not limited to the embodiments. For example, the functional block diagrams illustrating the trouble case data generating devices and the functional block diagrams illustrating the common trouble case data generating devices do not necessarily correspond to actual program module configurations.

In addition, the configurations of the tables described above are examples. The tables are not limited to the aforementioned configurations. In each of the processes illustrated in the flowcharts, the order of the steps can be changed as long as the result of the process is not changed. In addition, in each of the processes illustrated in the flowcharts, at least two of the steps can be performed in parallel as long as the result of the process is not changed.

In each of the component setting tables (refer to FIG. 15), device type IDs, information on settings for files and the like may be registered instead of the instance IDs.

Figure 29:
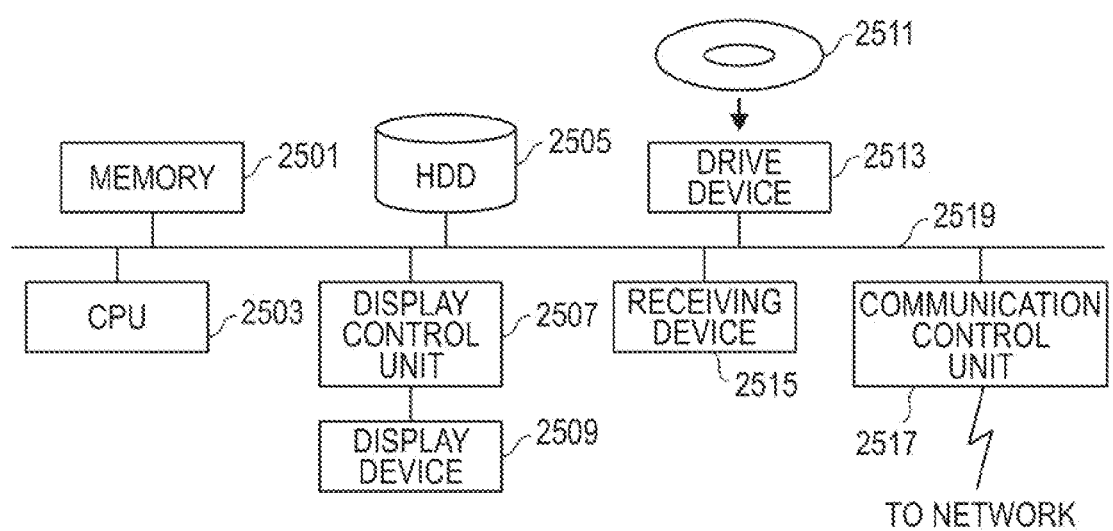
FIG. 29 is a functional block diagram illustrating a computer.

Each of the aforementioned trouble case data generating devices can be achieved by a computer. In addition, each of the aforementioned common trouble case data generating devices can be achieved by a computer. In an example, a computer illustrated in FIG. 29 may be used. The computer illustrated in FIG. 29 includes: a memory 2501; a processor (CPU) 2503; a hard disk drive (HDD) 2505; a display control unit 2507 that is connected to a display device 2509; a drive device 2513 for removable disk 2511; a receiving device 2515; and a communication control unit 2517 that is connected to a network. The memory 2501, the processor (CPU) 2503, the HDD 2505, the display control unit 2507, the drive device 2513, the receiving device 2515 and the communication control unit 2517 are connected to each other via a bus 2519.

In this case, an operating system (OS) and application programs that enable processes according to the present example to be performed are stored in a storage unit such as the HDD 2505. The OS and the application programs may be read from the HDD 2505, stored in the memory 2501, and executed by the CPU 2503. The CPU 2503 may control the display control unit 2507, the communication control unit 2517, and the drive device 2513 so that the display control unit 2507, the communication control unit 2517, and the drive device 2513 perform necessary operations. In addition, data that is being processed is stored in the memory 2501 and may be stored in the HDD 2505 when necessary. In the present example, the application programs that enable the processes to be performed may be stored in the computer-readable removable disk 2511, delivered and installed in the HDD 2505 from the drive device 2513. The application programs may be installed in the HDD 2505 through a network such as the Internet and the communication control unit 2517. In the computer, the aforementioned various functions are achieved by causing the hardware such as the CPU 2503 and the memory 2501 to operate with the OS and the necessary application programs.

The system data storage unit 1001, the template data storage unit 1005, the first trouble case data storage unit 1011 and the common trouble case data storage unit 1015, which are illustrated in FIG. 1, may each be achieved by the memory 2501, the HDD 2505 or the like. The same applies to the system data storage unit 3001 (illustrated in FIG. 3), the first trouble case data storage unit 3005 (illustrated in FIG. 3), the common trouble case data storage unit 3009 (illustrated in FIG. 3), the system data storage unit 5001 (illustrated in FIG. 25), the template data storage unit 5005 (illustrated in FIG. 25), the first trouble case data storage unit 5011 (illustrated in FIG. 25), the system data storage unit 7001 (illustrated in FIG. 27), and the first trouble case data storage unit 7005 (illustrated in FIG. 27).

The reading processing unit 1003, the extracting processing unit 1007, the specifying processing unit 1009 and the storage processing unit 1013, which are illustrated in FIG. 1, may each be achieved by a combination of the processor 2503 and a program or by causing the processor 2503 to execute the program. Specifically, the processor 2503 may function as each of the aforementioned processing units by operating according to the program stored in the HDD 2505 or the memory 2501. The same applies to the specifying processing unit 3003 (illustrated in FIG. 3), the storage processing unit 3007 (illustrated in FIG. 3), the reading processing unit 7003 (illustrated in FIG. 25), the extracting processing unit 7007 (illustrated in FIG. 25), the specifying processing unit 7009 (illustrated in FIG. 25), the trouble case extracting processing unit 7013 (illustrated in FIG. 25), the specifying processing unit 7003 (illustrated in FIG. 27) and the trouble case extracting processing unit 7007 (illustrated in FIG. 27).

In addition, programs that enable the computer to execute the processes according to the aforementioned embodiments can be generated. The programs are stored in a computer-readable storage medium (such as a flexible disk, a CD-ROM, or a magneto-optical disk) or a computer-readable storage device (such as a memory or a hard disk). Intermediate results of the processes are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A method of generating common trouble case data for managing a plurality of systems, the method comprising:
   obtaining first identifiers of actual system components and a second identifier of a template from a system data storage unit;
   obtaining third identifiers of definitional system components from a template data storage unit on the basis of the second identifier, the third identifiers being associated with the second identifier, the template defines any one of specifications and connection relationships of the definitional system components;
   selecting, by a computer, a first identifier subset among the first identifiers on the basis of the third identifiers, the first identifiers of the first identifier subset being identical to the third identifiers; and
   selecting, by the computer, a first trouble case data subset among a plurality of first trouble case data pieces stored in a first trouble case data storage unit on the basis of the first identifier subset to generate the common trouble case data, the first trouble case data subset including the first identifier subset.

2. The method according to claim 1, further comprising:
   obtaining second trouble case data pieces from a second trouble case data storage unit, the second trouble case data pieces including system component name data pieces;
   obtaining a second identifier subset of the first identifiers from the system data storage unit, the second identifier subset being associated with the system component name data pieces; and
   generating trouble case data pieces including the second trouble case data pieces and the first identifiers of the second identifier subset as the first trouble case data pieces.

3. The method according to claim 1, further comprising:
   storing the first trouble case data subset in a third trouble case data storage unit.

4. The method according to claim 1, further comprising:
   receiving a request specifying the system,
   wherein the computer generates the common trouble case data that is relevant to the system specified by the request.

5. The method according to claim 1, further comprising:
   wherein each of the actual system components is a system component that constitutes one of the plurality of systems, and the template is used for building the one of the plurality of systems;
   wherein each of the definitional system components is a system component defined by the template.

6. The method according to claim 1, further comprising:
   wherein the plurality of first trouble case data pieces includes the first identifiers of the actual system components where trouble has occurred.

7. A method of generating common trouble case data for managing a plurality of systems, the method comprising:
   obtaining first type identifiers of devices from a system data storage unit, the devices being associated with system components that constitute respective systems;
   counting the number of each of the first type identifiers;
   selecting, by a computer, a first identifier subset among the first type identifiers on the basis of the counted numbers, the counted number of the first identifier of the first identifier subset satisfying a specified condition; and
   selecting, by the computer, a first trouble case data subset among a plurality of first trouble case data pieces stored in a first trouble case data storage unit on the basis of the first identifier subset to generate the common trouble case data, the first trouble case data subset including the first identifier subset.

8. The method according to claim 7, further comprising:
   obtaining second trouble case data pieces from a second trouble case data storage unit, the second trouble case data pieces including system component name data pieces;
   obtaining a second identifier subset of the first type identifiers from the system data storage unit, the second identifier subset being associated with the system component name data pieces; and
   generating trouble case data pieces including the second trouble case data pieces and the first type identifiers of the second identifier subset as the first trouble case data pieces.

9. The method according to claim 7, further comprising:
   storing the first trouble case data subset in a third trouble case data storage unit.

10. The method according to claim 7, wherein the predetermined condition is whether a ratio of the counted number of the first type identifier divided by a total number of the respective systems exceeds a predetermined threshold value.

11. The method according to claim 7, wherein the plurality of first trouble case data pieces includes the first type identifiers of the devices where trouble has occurred.

12. A non-transitory computer-readable medium that stores therein a computer program for generating common trouble case data for managing a plurality of systems, the program causing a computer to execute a process, the process comprising:
   obtaining first identifiers of actual system components and a second identifier of a template from a system data storage unit;
   obtaining third identifiers of definitional system components from a template data storage unit on the basis of the second identifier, the third identifiers being associated with the second identifier, the template defines any one of specifications and connection relationships of the definitional system components;
   selecting a first identifier subset among the first identifiers on the basis of the third identifiers, the first identifiers of the first identifier subset being identical to the third identifiers; and
   selecting a first trouble case data subset among a plurality of first trouble case data pieces stored in a first trouble case data storage unit on the basis of the first identifier subset to generate the common trouble case data, the first trouble case data subset including the first identifier subset.

13. The non-transitory computer-readable medium to claim 12, the process further comprising:

obtaining second trouble case data pieces from a second trouble case data storage unit, the second trouble case data pieces including system component name data pieces;

obtaining a second identifier subset of the first identifiers from the system data storage unit, the second identifier subset being associated with the system component name data pieces; and generating trouble case data pieces including the second trouble case data pieces and the first identifiers of the second identifier subset as the first trouble case data pieces.

14. The non-transitory computer-readable medium to claim 12, the process further comprising:

receiving a request specifying the system, wherein the computer generates the common trouble case data that is relevant to the system specified by the request.

15. The non-transitory computer-readable medium to claim 12, wherein each of the actual system components is a system component that constitutes one of the plurality of systems, and the template is used for building the one of the plurality of systems;

wherein each of the definitional system components is a system component defined by the template.

16. The non-transitory computer-readable medium to claim 12, wherein the plurality of first trouble case data pieces includes the first identifiers of the actual system components where trouble has occurred.

17. A non-transitory computer-readable medium that stores therein a computer program for generating common trouble case data for managing a plurality of systems, the program causing a computer to execute a process, the process comprising:

obtaining first type identifiers of devices from a system data storage unit, the devices being associated with system components that constitute respective systems;

counting the number of each of the first type identifiers;

selecting a first identifier subset among the first type identifiers on the basis of the counted numbers, the counted number of the first identifier of the first identifier subset satisfying a specified condition; and selecting a first trouble case data subset among a plurality of first trouble case data pieces stored in a first trouble case data storage unit on the basis of the first identifier subset to generate the common trouble case data, the first trouble case data subset including the first identifier subset.

18. The non-transitory computer-readable medium according to claim 17, the process further comprising:

obtaining second trouble case data pieces from a second trouble case data storage unit, the second trouble case data pieces including system component name data pieces;

obtaining a second identifier subset of the first type identifiers from the system data storage unit, the second identifier subset being associated with the system component name data pieces; and generating trouble case data pieces including the second trouble case data pieces and the first type identifiers of the second identifier subset as the first trouble case data pieces.

19. The non-transitory computer-readable medium according to claim 17, wherein the predetermined condition is whether a ratio of the counted number of the first type identifier divided by a total number of the respective systems exceeds a predetermined threshold value.

20. The non-transitory computer-readable medium according to claim 17, wherein the plurality of first trouble case data pieces includes the first type identifiers of the devices where trouble has occurred.

21. A method of generating trouble case data, the method comprising:

obtaining, from a first memory, component identifiers of system components used in a system and a template identifier of a template used for a construction of the system, the template defines any one of specifications and connection relationships of the system components;

obtaining, from a second memory, one or more of component identifiers of one or more of components defined by the template corresponding to the obtained template identifier, the second memory storing correlation between the template identifier and the one or more of component identifiers of the one or more of the components defined by the template;

specifying, by a computer, a component identifier from the component identifiers obtained from the first memory, the specified component identifier being identical to any of the one or more of component identifiers obtained from the second memory; and selecting trouble case data including the specified component identifier from a plurality of trouble case data pieces stored in a third memory.

* * * * *